United States Patent [19]

Myers et al.

[11] Patent Number: 5,473,721

[45] Date of Patent: Dec. 5, 1995

[54] MULTI-MODE OPTICAL CIRCUIT TO COUPLE LIGHT BETWEEN VARIOUS OPTICAL ELEMENTS AND METHOD OF FABRICATING SAME

[75] Inventors: W. Michael Myers; Donnette E. Haney; Shin Sumida; Tadashi Miyashita, all of Columbus, Ohio

[73] Assignee: Photonic Integration Research, Inc., Columbus, Ohio

[21] Appl. No.: 227,135

[22] Filed: Apr. 13, 1994

[51] Int. Cl.[6] .................................................. G02B 6/10
[52] U.S. Cl. ...................... 385/129; 385/130; 385/132; 264/1.24
[58] Field of Search ................................ 385/129, 130, 385/131, 132, 133, 14, 31, 50; 264/1.24

[56] References Cited

U.S. PATENT DOCUMENTS 4,733,927  3/1988  Jackson et al. .................. 385/129 X
5,334,551  8/1994  Komatsu ............................ 385/129 X
5,408,566  4/1995  Eda et al. ......................... 385/129 X Primary Examiner—John D. Lee
Assistant Examiner—Phan T. H. Palmer
Attorney, Agent, or Firm—Porter, Wright, Morris & Arthur

[57] ABSTRACT

This invention comprises an optical circuit for the coupling of multi-mode optical fibers to, from and between other fibers, sources, detectors, and other optical elements, and method of fabricating same. The optical circuits of this invention can have round waveguides to provide a better match with round fibers, resulting in higher efficiency, lower loss, and other improvements. A substrate having a relatively low index of refraction is either machined or molded such that semi-circular grooves are formed in substrate surfaces. When two such substrates are aligned and adhered together, tubular channels in a substrate result. The design and placement of these tubular channels can be such that any number of optical functions can be performed, including splitting, tapping, mixing, and coupling. The optical circuits of this invention are relatively easy to manufacture and inexpensive, and exhibit low propagation and coupling loss.

11 Claims, 14 Drawing Sheets

Figure 10

| Round Waveguide Diameter (μm) | Coupling Loss (dB) | Square Waveguide Width (μm) | Coupling Loss (dB) |
|---|---|---|---|
| 750 | 0.117 | 750 | 1.166 |
| 755 | 0.174 | 755 | 1.223 |
| 760 | 0.232 | 760 | 1.281 |
| 765 | 0.289 | 765 | 1.338 |
| 770 | 0.345 | 770 | 1.394 |
| 775 | 0.401 | 775 | 1.451 |
| 780 | 0.457 | 780 | 1.506 |
| 785 | 0.513 | 785 | 1.562 |
| 790 | 0.568 | 785 | 1.562 |
| 795 | 0.623 | 795 | 1.672 |
| 800 | 0.677 | 800 | 1.726 |

Figure 14

| MARCOC | Theoretical Insertion Loss (intrinsic loss) | Average Insertion Loss (from measured data) | Estimated Insertion Loss (with process improvements) |
|---|---|---|---|
| 1 x 2 Splitters | 3.0 dB | 4.0 dB | 3.5-3.8 dB |
| 3-Port Star Coupler | 4.8 dB | 8.1 dB | 6.6-7.6 dB |
| 2 x 2 Star Coupler | 3.0 dB | 5.0 dB | 4.0-4.5 dB |
| 4 x 4 Star Coupler | 6.0 dB | 8.3 dB | 7.4-8.0 dB |
| 7 x 7 Star Coupler | 8.5 dB | 11.6 dB | 10.2-11.3 dB |

MULTI-MODE OPTICAL CIRCUIT TO COUPLE LIGHT BETWEEN VARIOUS OPTICAL ELEMENTS AND METHOD OF FABRICATING SAME

FIELD OF THE INVENTION

This invention relates to optical circuits for the coupling of multi-mode optical fibers to other fibers, sources, detectors, and conventional optical elements, and method of fabricating same. The methods of this invention can be applied to making optical splitters, taps, multi/demultiplexers, couplers, combiners, and various other types of optical circuits. The circuits of this invention find applications in fields that require good performance, high volume and low cost.

BACKGROUND OF THE INVENTION

Previous methods for making multi-mode waveguide circuits have used photo-lithography and relatively thick layers of a photoresist to create the circuit pattern. The advantage of lithographic methods is that they are amenable to mass production and can provide good control of circuit geometry and dimensions. Two significant disadvantages are:

1) Lithographic methods are limited to producing only square or rectangular channels; this results in significant light loss due to the geometric mis-match between a round fiber and a square channel.

2) Lithographic methods inherently produce sidewall striations (non-smooth channels) due to mask imperfections, photoresist impurities, and various sources of scattered light in the lithographic process. These striations in the photoresist image introduce scattering loss in the resulting optical circuits as light is guided down the channel.

In the cases where the waveguide itself is composed of a photoresist or a photosensitive material, there is the added disadvantage that such materials are not optimized for light transmission and may exhibit a high loss due to absorption of the light as it propagates through the waveguide. In general, lithographic processes work well for thin photoresist layers, but are difficult to apply in the thick films required for multi-mode optical circuits.

Another method for making multi-mode optical circuits involves twisting glass or plastic fibers together, and then heating/stretching the twisted region so as to form N×N couplers/splitters. In some cases, this method works well, but there are significant disadvantages: 1) these fused devices are typically made one at a time and are not amenable to mass production; they are relatively expensive; 2) it is difficult to control the splitting ratios or uniformity with fused fiber devices; and 3) fused fiber devices are limited in that some types of circuit functions cannot be implemented by fused fiber devices.

SUMMARY OF THE INVENTION

This invention provides a simple and flexible means of manufacturing multi-mode optical circuits that exhibit low loss, efficient coupling to multi-mode optical fibers, and good environmental performance. The methods of this invention are best applied to circuits that are used with multi-mode optical fibers having an outside diameter of greater than about 350 μm, but with some modifications, these methods can be applied to the manufacture of circuits for use with fiber diameters as small as 100 μm.

Many types of circuits can be manufactured by the methods of this invention, including splitters, couplers, taps, etc. Furthermore, this invention provides relatively easy means of integrating multi-mode optical circuits with many types of optical elements, such as sources, detectors, mirrors, diffraction gratings, dielectric filters, or even slots and wells for chemical sensing agents. An important advantage of this invention is that the time from circuit concept to completed circuit can be relatively short (on the order of several hours); a circuit design/geometry can be perfected by trial-and-error in a very short time frame. This is not possible with other techniques.

The present invention provides a multi-mode optical circuit to couple light to, from, and between multi-mode optical fibers, optical sources/detectors, and other various optical elements, and method of fabricating this multi-mode optical circuit. A substrate having a predetermined index of refraction is provided. At least one tubular channel is formed in the substrate and the channel(s) has an opening on at least one side of the substrate. At least one of the tubular channels is filled with an optically conductive waveguide material in a liquid state and the waveguide material has a relatively higher index of refraction than the substrate. Fibers or optical elements can then be operatively connected to the face of, or inserted inside of, the tubular openings to complete an optical circuit. The tubular channels may be formed by drilling operations such as conventional machining methods or laser drilling methods.

Multi-mode optical circuits can also be fabricated by providing a substrate having a predetermined index of refraction, wherein the substrate is composed of a sandwich structure with two halves. At least one tubular channel is formed in the substrate by making at least one shaped groove in a surface of the halves to define an optical circuit. When the halves are adhered together, at least one tubular channel is formed in the substrate. The channel(s) has at least one opening on at least one side of the substrate. The tubular channel(s) that is formed in the surface of the halves may be semi-circular, rectangular, or arbitrarily shaped. This correspondingly results in the tubular channel having a circular, rectangular, or arbitrary shape in cross-section. The channel is filled with an optically conductive waveguide material having a relatively higher index of refraction than the substrate. Various fibers and optical components can be operatively connected to at least one opening of the channel(s) formed in the substrate. The channel(s) may be molded, stamped, or etched into the surface of the halves of the substrate.

The foregoing and other objects and advantages of the present invention will become more apparent when viewed in light of the accompanying drawings and the following description.

BRIEF DESCRIPTION OF THE DRAWINGS

FIG. 10 is a table showing the fiber coupling loss for round and square waveguides.

FIG. 14 is a table showing the optical performance of various MARCOCs.

DETAILED DESCRIPTION OF THE INVENTION AND THE PREFERRED EMBODIMENTS

The optical circuits of this invention, in a preferred embodiment, are referred to as Machined (or Molded) Acrylic, Resin Core, Optical Circuits, or MARCOCs. Acrylic was used as a substrate in the embodiment detailed here, but other substrate materials known in the art may be adapted to the methods of this invention.

In a preferred embodiment of this invention, a computer numerically controlled (CNC) milling machine is used to cut semi-circular grooves in a strip or sheet of a suitable plastic material. Acrylic or acrylic composition is an example of a suitable plastic, since it has a relatively low index of refraction, good optical quality, and it can be easily polished by exposure to solvents or solvent vapors. The pattern of the machined grooves is defined by the type of circuit to be implemented. Multiple copies of the circuit pattern can be programmed to cut in a single operation. The circuit pattern may include crosses, symmetrical Y-junctions, "weighted" Y-taps, wells, and straight or curved sections.

The CNC milling machine will typically use a ball-nose end-mill or a micro-burr as a cutting tool, where the tool diameter is essentially the same as the fiber or fiber bundle diameter. The cutting depth is typically about one-half of the fiber or fiber bundle diameter. Precision of the CNC machining, or subsequent molding operations can be as accurate as ±5 µm, which is more than adequate for most multi-mode circuits. Depending on the circuit complexity, typical machining time is about 1–3 minutes per circuit as presently reduced to practice, but shorter times are possible.

After the circuit halves are machined, the top and bottom halves are aligned and adhered together, such that the semi-circular grooves become essentially round tubular channels through the body of the substrate. These channels can then be filled with a suitable liquid or resin having a relatively higher index of refraction than the machined or molded circuit body. Fibers or optical elements can then be connected to the face of, or inserted inside of, the tubular openings to complete the optical circuit.

The methods and devices of this invention are most easily applied to MARCOCs that will be used with multi-mode optical fibers having an outside diameter of about 350 µm or larger. For fibers in this size range, a CNC mill can be used to directly machine the grooves into the body of the circuit by using commercially available end-mill tools or microburrs. The MARCOCs and fabrication processes described here were designed specifically for use with plastic multi-mode optical fibers, having a numerical aperture of ≈0.47, and an outside diameter of ≈750 microns. However, the methods of this invention can be applied to fabricating optical circuits for use with many multi-mode fibers.

Figure 1A:
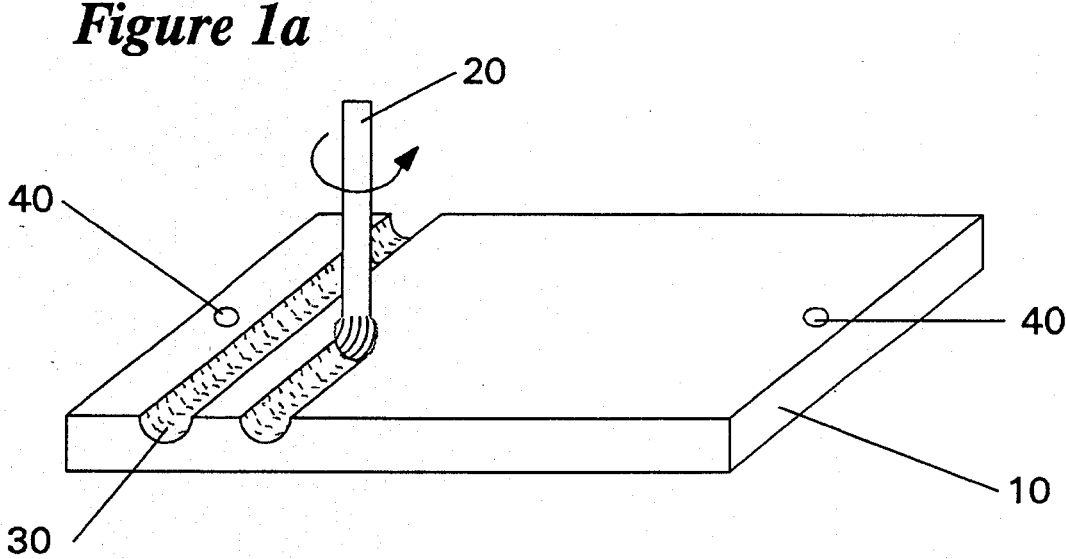
FIG. 1a shows semi-circular grooves and alignment holes machined into a substrate with a round cutting tool.

In FIG. 1a, a substrate 10 is securely attached to a stage or vacuum chuck and accurately leveled beneath the spindle of a CNC mill. A CAD motion control system and precision drill press (or similar equipment) may also be used for the machining step. In an embodiment of the present invention, a circuit pattern is machined into the substrate in the form of semi-circular grooves 30.

Figure 1B:
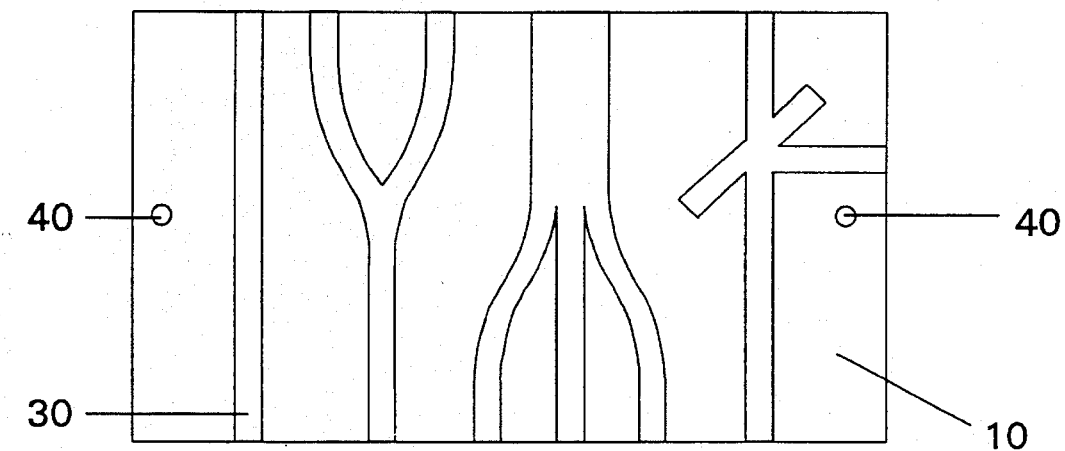
FIG. 1b is a top view of a substrate after machining the circuit grooves.

FIG. 1b shows a top view of the groove pattern for various types of optical circuits. Also shown are alignment holes 40 at each end of the substrate; these holes will aid in the final assembly. Preferably, the diameter of the cutting tool 20 is about equal to the fiber or fiber bundle diameter and the groove depth is about one-half of the fiber or fiber bundle diameter. In the embodiment discussed here, the fiber diameter was around 750 µm, so a 1/32" (794 µm) ball-nose end-mill was used for machining the grooves. Other tools that can be used for machining the grooves include microburrs, dental-burrs, or custom made end-mills.

For making circuits that are compatible with multi-mode fibers in the range of 50 microns to 350 microns, a combination of lithographic, laser ablation and conventional machining techniques may be applied to make the grooves.

Typical machining parameters that will yield smooth grooves are: a feed rate of 1–2" per minute and a tool speed of 6000–8000 RPM. In the case of a polymer substrate, either air or liquid cooling will prevent overheating and enhance the smoothness of the groove walls. Multiple copies of the circuit pattern can be formed out across the substrate sheet. Accuracy of the machining step is typically ±10 µm, but with precision equipment and sufficient technique, an accuracy of ±5 µm or better can be readily achieved.

Figure 2:
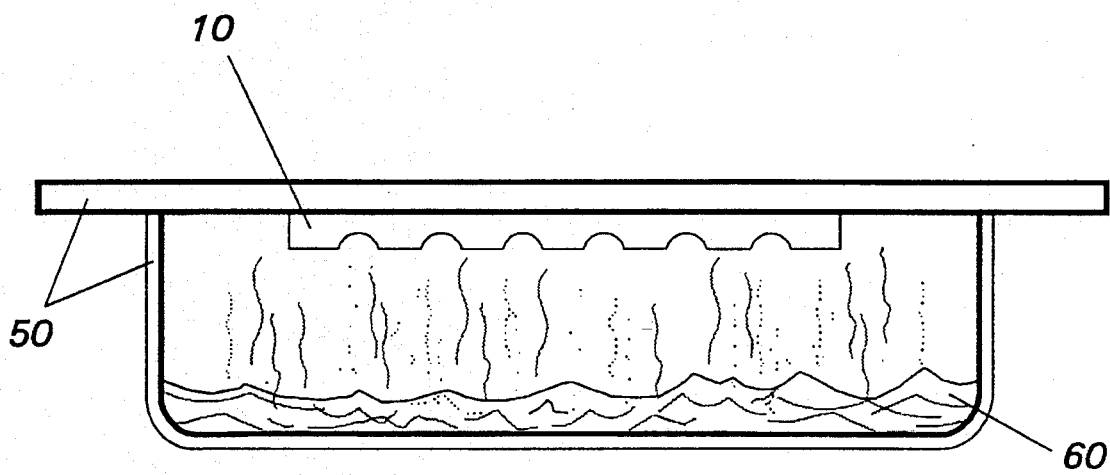
FIG. 2 illustrates the exposure of the semi-circular grooves to vapors of a suitable solvent in order to make the grooves optically smooth.

The groove walls may be made optically smooth by dipping the substrate into a suitable solvent, solvent mixture, or solvent/polymer mixture. An alternative method for polishing the groove walls is shown in FIG. 2; an acrylic substrate is mounted in a closed container 50 with a few cubic centimeters of dichloromethane 60 as a solvent. The solvent vapors effectively dissolve the surface of the machined acrylic 10, such that any micron-sized machining marks are removed. A solvent-vapor polish is fast, highly effective, and amenable to a manufacturing process.

At this point, the machined and polished groove pattern can be used directly to make the MARCOC or it can be used as a master to produce a mold or stamp. In the latter case, the grooved substrate can be coated with a thin layer of conductive and adherent metal and then electroplated to build up a hard metal replica of the grooves. After separating the plated metal replica from the machined master, the semi-circular ridges on the replica can then be used as one face of a mold, or as a stamp, to emboss the circuit pattern in a suitably soft material.

Figure 3:
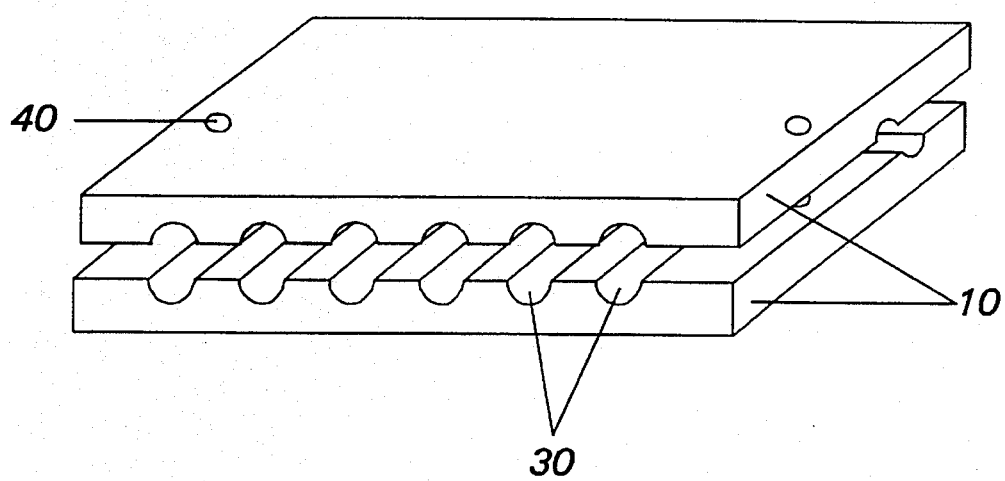
FIG. 3 shows two grooved substrates (one the mirror image of the other) being aligned and assembled to form the circuit body.
Figure 4:
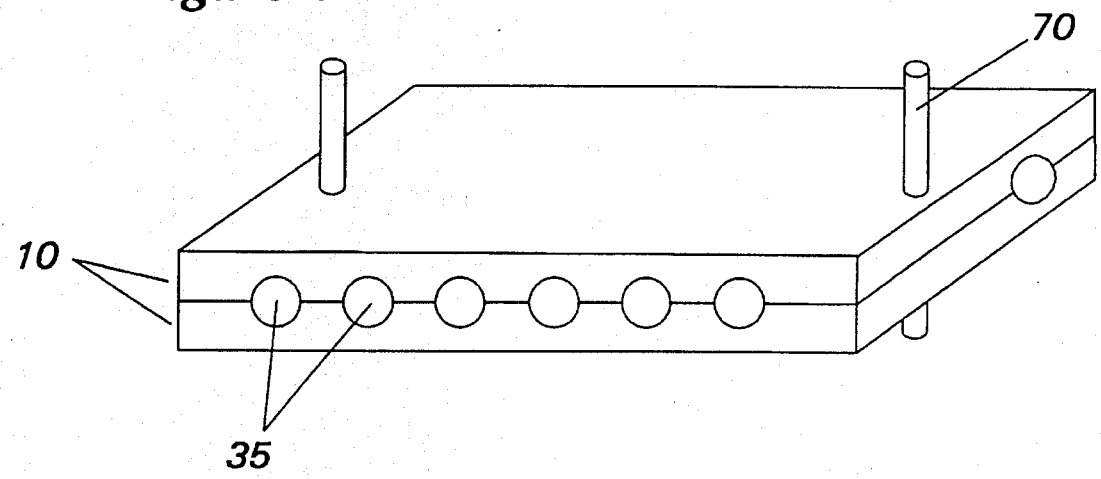
FIG. 4 shows the grooved substrates adhered together such that the semi-circular grooves become essentially circular tubular channels through the body of the substrate.

For circuit patterns that are symmetric, the grooved surfaces of two identically machined (or molded or stamped) substrates are placed in contact, as shown in FIG. 3. For non-symmetric circuit patterns, one of the substrates has a groove structure that is a mirror image of the opposing sheet. Alignment of the sheets is accomplished by placing pins 70 into the alignment holes 40, which are machined at the same time as the circuit grooves into a non-functional area of the sheet. The pins can provide an alignment accuracy of ±5 μm or better. After alignment, the two substrates halves are adhered together, such that the semi-circular grooves become circular tubular channels 35 through the body of the sandwich structure, as shown in FIG. 4. The two substrate halves may be adhered or bonded together with glue, cement, adhesive or other means known in the art.

Figure 5:
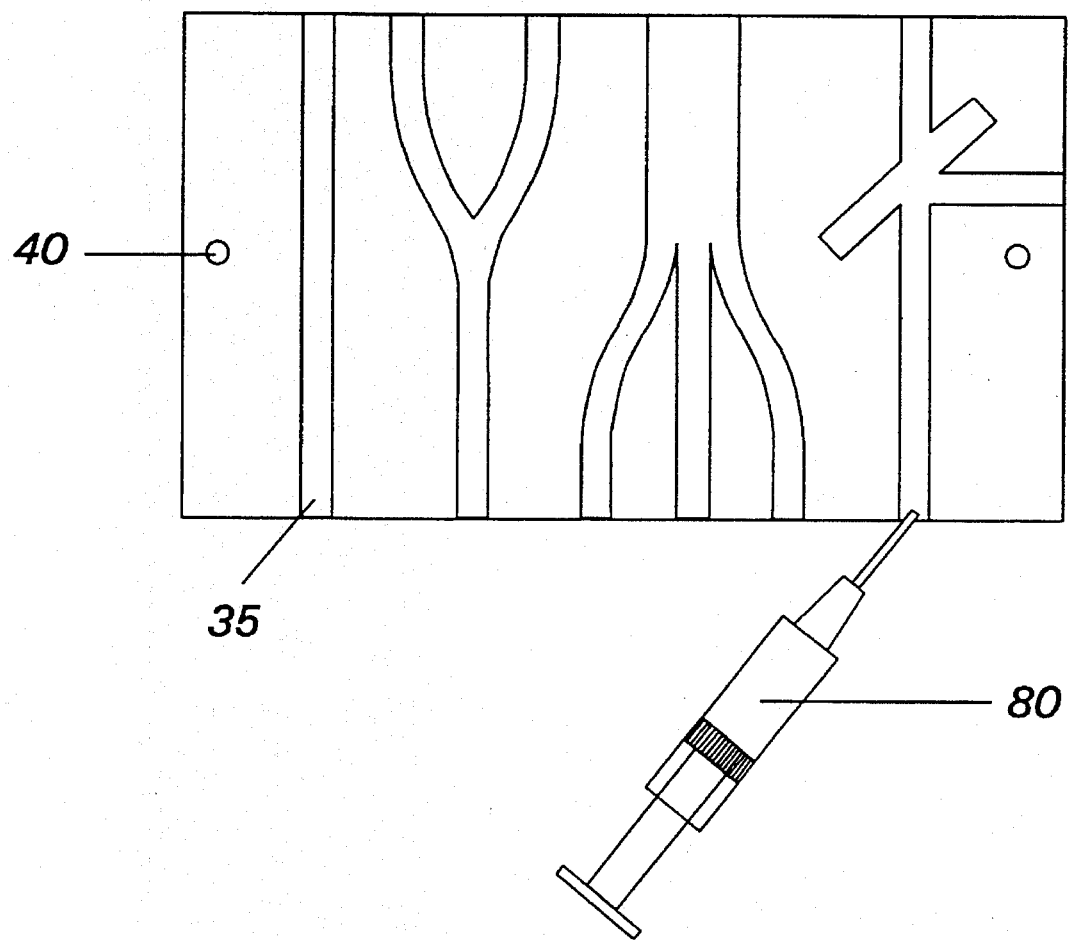
FIG. 5 illustrates a liquid resin having a higher index of refraction than the substrate being inserted into the waveguiding tubular channels of the circuit.

A suitable liquid or resin 80, having a relatively higher index of refraction than the substrate, is inserted into the tubular channels 35 of the circuit body as shown in FIG. 5. For an acrylic substrate, the index of commercially available compositions is around 1.489, ±0.002. The liquid or resin index for filling the tubular channels can be selected to make the MARCOC waveguides match the properties of the fiber being used. There are many liquids, epoxies, and UV curable resins with a range of indices between 1.5 and 1.65. For the devices described in this embodiment, a resin index of 1.56 was selected such that the NA of the MARCOCs would match the NA of the selected fibers (≈0.47).

Figure 6:
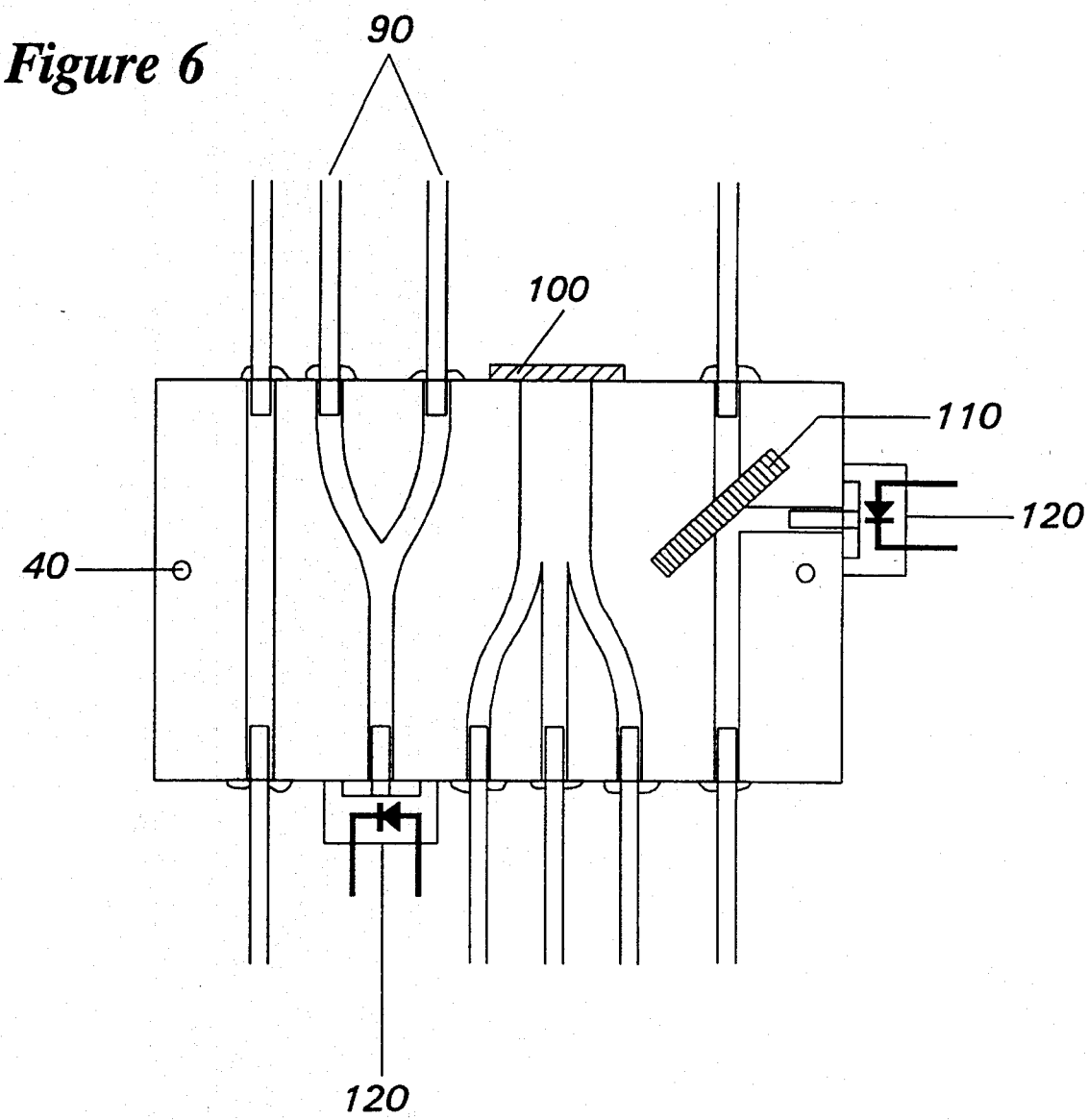
FIG. 6 illustrates examples of multi-mode fibers inserted partway into the tubular channels, and various optical elements connected to the face of the tubular channels or inserted into appropriate slots.

FIG. 6 shows fibers 90 inserted partway into the resin-filled tubular channels 35. Also, mirrors 100, filters & gratings 110, sources & detectors 120, and other optical elements can be aligned and bonded to the tubular openings of the MARCOC, as shown in FIG. 6. In some cases, the slots for optical elements can be internal to the body of the MARCOC, which will require that the optical elements be inserted before assembling the two halves of the circuit body. In the case of an internal turning mirror, a slot can be milled into the substrate that will contain only air in the completed circuit. An air filled slot, placed in the path of a waveguide, acts as a mirror to make bends and helps to reduce the overall circuit size.

In the case of a liquid resin, all openings to the MARCOC channels are sealed. Additionally, it is helpful to provide a sealed reservoir in the body of the MARCOC, connected to the waveguiding regions by a relatively narrow passage, such that expansion, contraction, and gas interchange of the liquid can take place without affecting the optical performance of the device.

For epoxy and UV cure resins, it is helpful to provide a reservoir with an opening to the outside of the MARCOC, such that as the epoxy or UV resin shrinks during cure, air can be pulled into an area that is optically non-functional.

Figure 7:
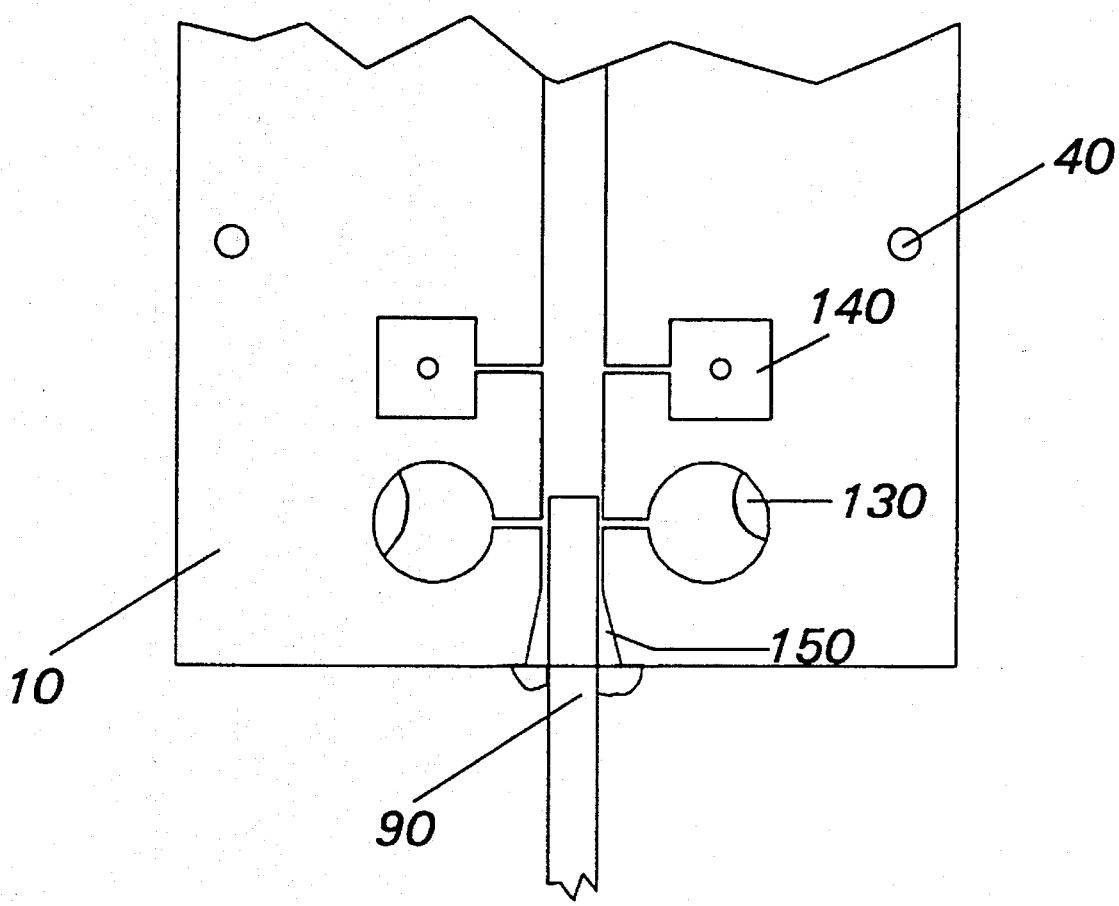
FIG. 7 shows examples of other structures that aid in the performance or manufacturing of Machined (or Molded) Acrylic, Resin Core, Optical Circuits (MARCOCs) including holes through the substrate for alignment pins, access ports for inserting the core resin, and reservoir chambers that will allow and compensate for resin shrinkage during any subsequent curing steps.

FIG. 7 shows examples of alignment holes 40, reservoir chambers 130, resin insertion ports 140, and tapered fiber inputs 150, all of which can be machined into the MARCOC body to accommodate various resin properties, resin insertion methods, and MARCOC assembly methods.

Figure 8:
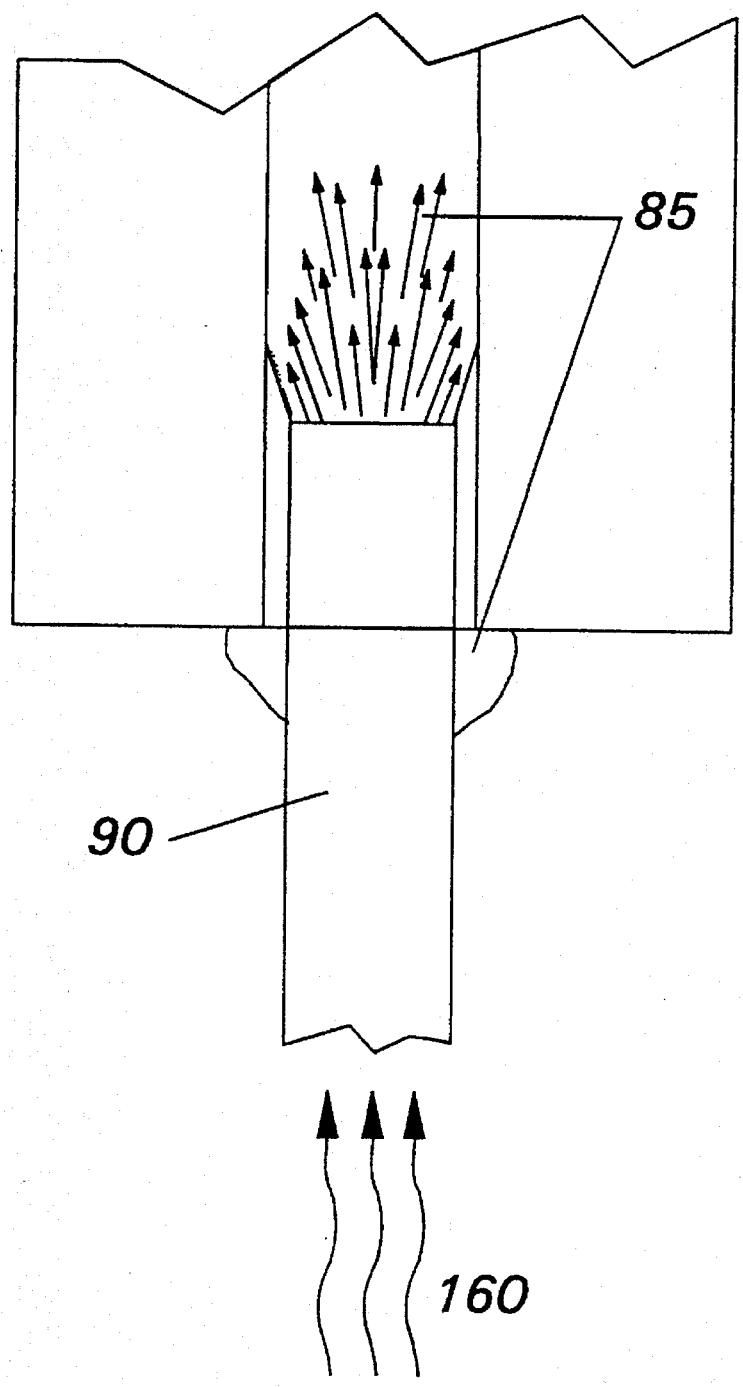
FIG. 8 illustrates the curing of an ultra-violet resin by inserting ultra-violet light into the fiber and curing the resin longitudinally, along the length of the waveguide, as opposed to transversely.

Furthermore, if a UV cure resin is used, it is helpful in some cases to cure the MARCOC waveguide longitudinally, by inserting UV light into one or several of the fibers. This cures the waveguide from one end to the other in a controlled manner. In FIG. 8, UV light 160 is directed into one of the attached fibers 90 to cure a UV resin 85 longitudinally along the waveguide, such that the regions of the waveguide closest to the fiber endface will become fully cured first and regions furthest away from the fiber endface will cure last. Using this technique, small pockets of resin in chambers located away from the waveguides and fiber endfaces will remain as a liquid or a gel, and can compensate for shrinkage of the resin in the light carrying portions of the MARCOC; otherwise, the effects of shrinkage during cure might create air bubbles or stress defects.

Figure 9:
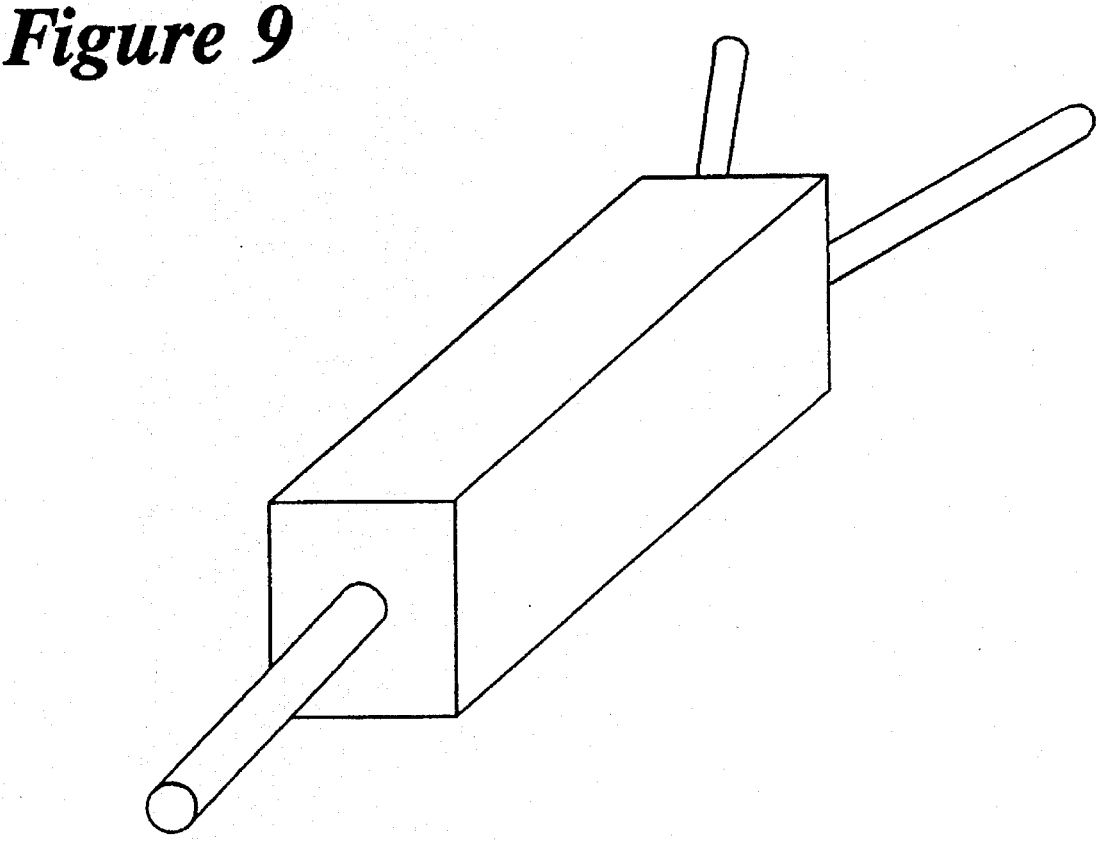
FIG. 9 is a perspective view of a completed 1×2 MARCOC after packaging by encapsulation in epoxy body.

After completing the MARCOC, the device can be suitably packaged to protect the circuit from handling and environmental conditions. FIG. 9 shows a 1×2 MARCOC after packaging by encapsulation in an epoxy body.

One of the primary advantages of this invention is that the waveguide channels can be round, which provides for a lower coupling loss between the waveguides and multi-mode optical fibers. The table in FIG. 10 compares the calculated coupling loss due to non-matching fiber and waveguide geometries for a 750 μm OD fiber (740 μm diameter core) when coupled to both round and square waveguides of varying dimensions. For square or rectangular waveguides, the fiber-to-waveguide coupling loss is typically about 1 dB higher than for round channels of comparable dimensions.

Figure 11:
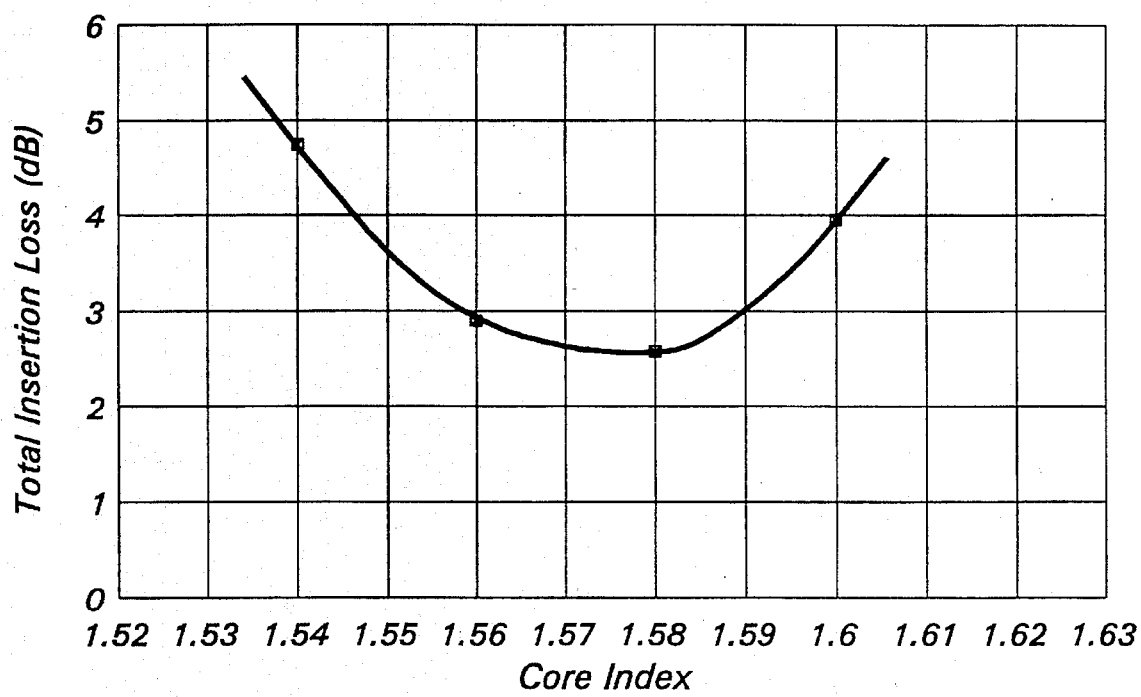
FIG. 11 is a graph showing the insertion loss as a function of core index of a MARCOC for a given fiber numerical aperture (NA).

Another advantage of the methods of this invention is that the numerical aperture (NA) of the MARCOC can be adjusted to match the NA of the attached fiber. The index of the liquid or resin used in the core of the MARCOC can be selected to provide the best match between fiber and waveguide. The graph in FIG. 11 shows the insertion loss of a straight waveguide MARCOC as the index of the core resin is varied. The graph in FIG. 11 is based on the following parameters: MARCOC guide length=9.0 cm; fiber pigtails=5.0 cm; index of acrylic=1.49; fiber NA=0.47; and theoretical optimum core index=1.56. In general, optimum performance of MARCOCs was achieved when the NA of the MARCOC was equal to or slightly greater than the fiber NA.

Figure 12:
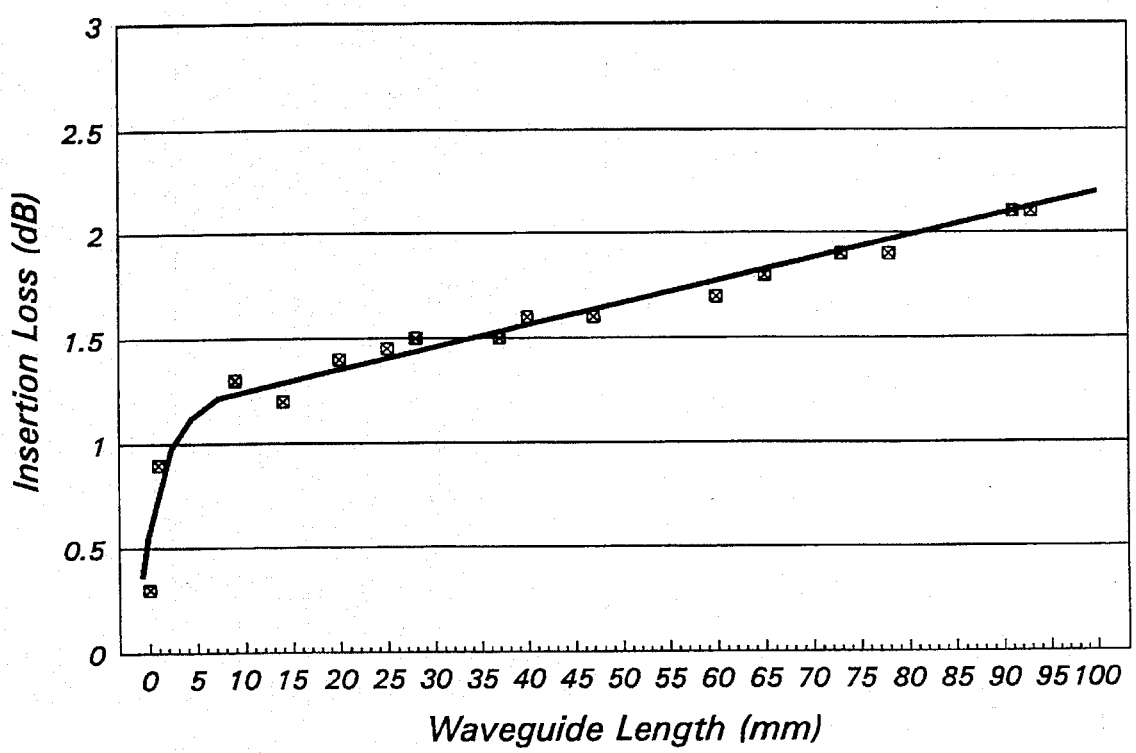
FIG. 12 is a graph showing the insertion loss, including propagation and coupling loss, for straight waveguide MARCOCs as a function of length.

The optical quality of MARCOC waveguides that have been polished by solvent vapors has been verified by measuring the propagation loss of a simple straight waveguide. The graph in FIG. 12 shows the insertion loss, including propagation and coupling loss, between two fiber endfaces inside of a straight waveguide MARCOC as a function of waveguide length. The distance between the fibers was incrementally reduced and the insertion loss was measured. The region between the fiber endfaces was filled with a liquid having an index of 1.565, and the MARCOC body was machined from acrylic. The graph in FIG. 12 is based on the following parameters: fiber diameter=750 μm: MARCOC channel diameter=780 μm; core index=1.565; wavelength=650 nm; and fiber-to-fiber coupling loss=0.6±0.3 dB. The measured propagation loss for these conditions was around 0.15 dB/cm. Similar values of propagation loss have been measured for UV cured resins. This exceptionally low value is comparable with the propagation loss obtained for waveguides made of optical quality glass.

Figure 13:
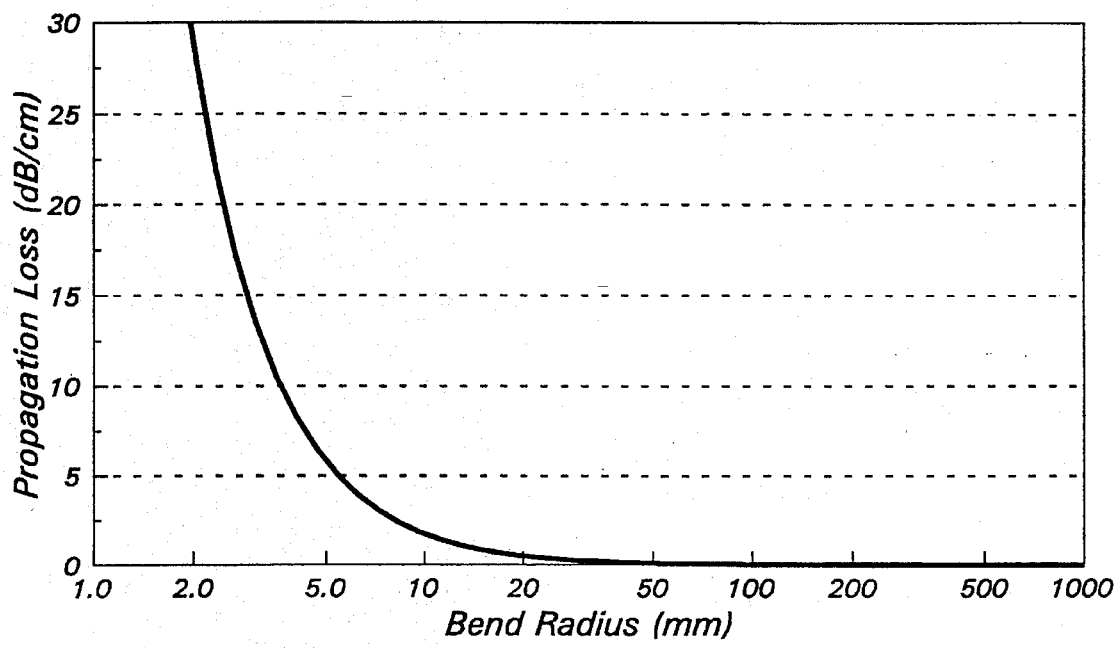
FIG. 13 is a graph showing the propagation loss of MARCOC waveguides as a function of bend radius.

The graph in FIG. 13 shows the insertion loss of a

MARCOC waveguide as a function of bend radius. For waveguide bend radii >30 mm, the propagation loss approaches that of straight waveguides. This property of MARCOC waveguides is about the same as that of optical fibers with a comparable NA.

The fabrication process outlined as the preferred embodiment of this invention has been extensively tested on a variety of circuit types and configurations. The measured optical performance of these various MARCOC devices is shown in the table of FIG. 14. The intrinsic loss represents the theoretical insertion loss of a perfect device based on the splitting ratio of the circuit. The average insertion loss represents measured data from actual devices and the estimated insertion loss represents what can be expected with improvements in the MARCOC manufacturing process.

Figure 15:
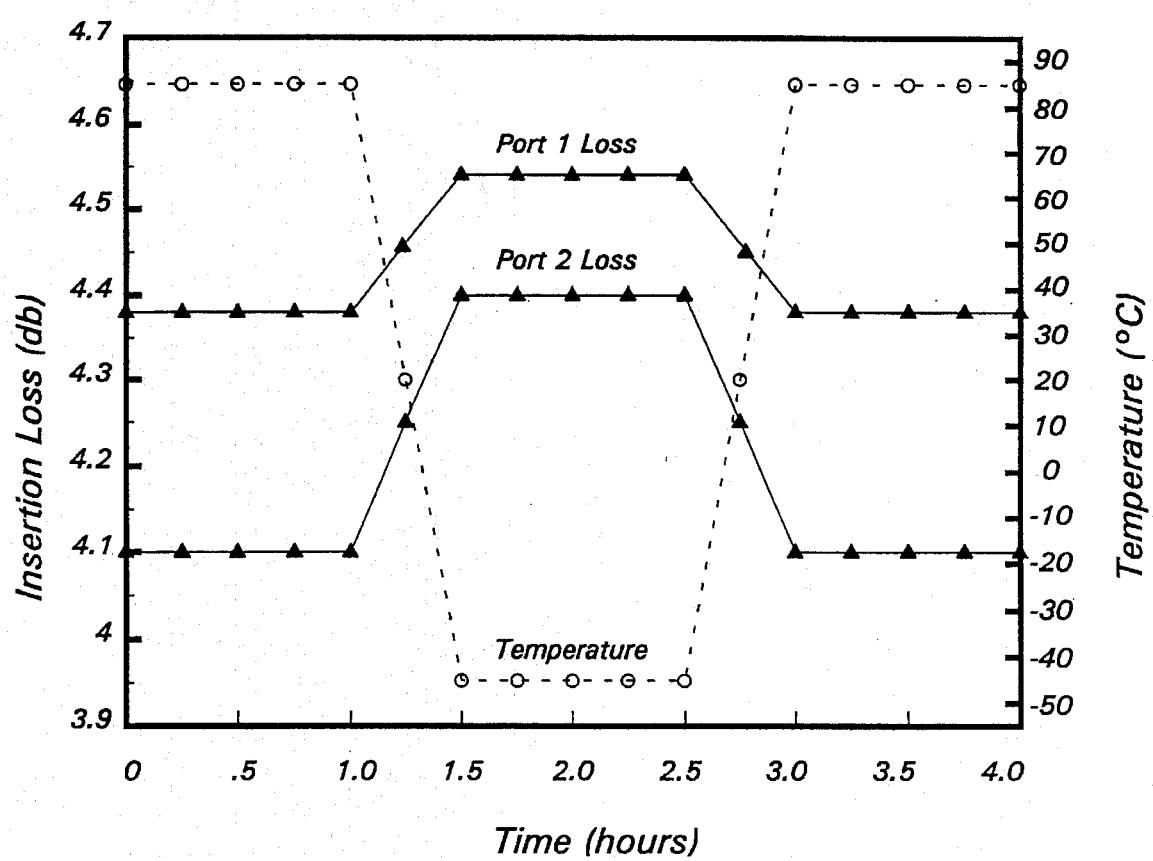
FIG. 15 is a graph showing the optical performance of a 1×2 MARCOC during thermal shock testing.

Various MARCOC devices have been subjected to environmental testing to verify the practicality of the methods and devices of this invention. The graph in FIG. 15 shows the optical performance of an epoxy encapsulated 1×2 MARCOC during a thermal shock test. The device was temperature cycled from +85° C. to −45° C. to +85° C. over a 4 hour period while the insertion loss was measured. Less than a 5% change in insertion loss was recorded for the temperature extremes of this test.

Other environmental tests were performed on MARCOCs that were fabricated in accordance with the present invention. These environmental tests include long-term storage at various temperatures, long-term temperature cycling between various temperatures, and long-term storage at various temperatures and humidity. The MARCOCs subjected to these environmental tests did not show significant degradation of optical performance.

The methods and devices of this invention have been reduced to practice, and have demonstrated the concept, effectiveness, and applicability of many types of MARCOCs. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. A multi-mode optical circuit to couple light to, from, and between multi-mode optical fibers, optical sources/detectors, and various optical elements, comprising:

a substrate having a predetermined index of refraction;

at least one tubular channel in said substrate, wherein said at least one channel has at least one opening on at least one side of said substrate; and said at least one tubular channel filled with an optically conductive waveguide material in a liquid state, said waveguide material having a relatively higher index of refraction than said substrate, said waveguide material being selected from the group comprising liquid epoxy or ultra-violet sensitive resin, and said waveguide material being curable to a solid state by application of means selected from the group comprising heat, light or chemical reaction.

2. The optical circuit of claims 1, further comprising a fiber inserted into at least one opening of said at least one channel.

3. The optical circuit of claim 1, further comprising an optical component operatively connected to at least one opening of said at least one channel.

4. The optical circuit of claim 1, further comprising at least one hollow slot in the body of said substrate, such that when said slot is placed in the waveguide path, turning mirrors result from internal reflection.

5. A multi-mode optical circuit to couple light to, from, and between multi-mode optical fibers, optical sources/detectors, and various optical elements, comprising:

a substrate having a predetermined index of refraction, said substrate being composed of a sandwich structure with two halves; and at least one tubular channel in said substrate formed by making at least one shaped groove in a surface of the halves to define the optical circuit, such that when the halves are adhered together, at least one tubular channel is formed in said substrate and said at least one channel has at least one opening on at least one side of said substrate.

6. The optical circuit of claim 5, wherein said at least one tubular channel has either a circular, rectangular, or arbitrary shape in cross-section.

7. The optical circuit of claim 5, wherein said at least one tubular channel is filled with an optically conductive waveguide material in a liquid state, said waveguide material having a relatively higher index of refraction than said substrate.

8. The optical circuit of claim 5, wherein the optically conductive waveguide material is selected from the group consisting of liquid epoxy and ultra-violet sensitive resin, and can be cured to a solid state by application of means selected from the group consisting of heat, light and chemical reaction.

9. The optical circuit of claim 5, wherein the surface of said at least one tubular channel is coated with a layer of reflective metal, such that the resulting at least one tubular channel reflects light from the metal surface.

10. The optical circuit of claim 5, wherein said substrate is composed of an acrylic composition.

11. The optical circuit of claim 5, further comprising at least one hollow slot in the body of said substrate, such that when said slot is placed in the waveguide path, turning mirrors result from internal reflection.

* * * * *